United States Patent [19]
Wong

[11] Patent Number: 5,313,142
[45] Date of Patent: May 17, 1994

[54] COMPACT FLUORESCENT LAMP WITH IMPROVED POWER FACTOR

[75] Inventor: John M. Wong, Buffalo Grove, Ill.

[73] Assignee: North American Philips Corporation, New York, N.Y.

[21] Appl. No.: 1,940

[22] Filed: Jan. 8, 1993

Related U.S. Application Data

[63] Continuation of Ser. No. 846,370, Mar. 5, 1992, abandoned.

[51] Int. Cl.⁵ .......................................... H05B 41/29
[52] U.S. Cl. .............................. 315/205; 315/209 R; 315/226; 315/244; 315/247; 315/DIG. 5; 363/37; 363/131
[58] Field of Search .............. 315/209 R, 226, 227 R, 315/244, 246, 247, 283, 200 R, 205; 363/37, 131

[56] References Cited

U.S. PATENT DOCUMENTS

| | | | |
|---|---|---|---|
| 4,935,672 | 6/1990 | Lammers et al. | 315/200 R |
| 5,050,057 | 9/1991 | Notohara et al. | 363/37 |
| 5,057,749 | 10/1991 | Nilssen | 315/247 |
| 5,059,867 | 10/1991 | Nerone et al. | 315/247 |

Primary Examiner—David Mis
Attorney, Agent, or Firm—Edward Blocker; Bernard Franzblau

[57] ABSTRACT

A compact fluorescent lamp in combination with a high frequency DC-AC converter includes a rectifier circuit and a buffer capacitor coupled between a source of low frequency AC voltage and the converter. A feedback capacitor couples a high frequency feedback signal corresponding to the converter output signal to the buffer capacitor via the rectifier circuit so as to improve the power factor of the combination.

25 Claims, 1 Drawing Sheet

COMPACT FLUORESCENT LAMP WITH IMPROVED POWER FACTOR

This is a continuation of application Ser. No. 07/846,370, filed Mar. 5, 1992, now abandoned.

BACKGROUND OF THE INVENTION

The present invention concerns an improved converter circuit which is especially useful in the lighting art. More particularly, it relates to a circuit for a compact fluorescent lamp which provides an improved power factor for energy conservation purposes.

Various circuits are known for energizing compact fluorescent lamps. It is common to use a half bridge circuit operating at a high frequency for such lamps. U.S. Pat. No. 4,935,672 issued Jun. 19, 1990 discloses one example of a prior art compact fluorescent lamp control circuit.

SUMMARY OF THE INVENTION

It is an object of this invention to provide an improved compact fluorescent lamp control circuit.

Another object of the invention is to provide an improved converter circuit useful for energizing discharge lamps, but not limited thereto.

One of the features of the invention is the provision of an LC circuit at the input to a compact fluorescent lamp control circuit.

An advantage of the invention is the simplicity of the changes needed to improve the power factor of compact fluorescent lamp control circuits.

In carrying out the invention there is provided, in combination, a compact fluorescent lamp with a high frequency DC-AC converter. The converter includes a pair of AC input terminals for coupling to a low frequency mains source of AC voltage. The AC input terminals have rectifying means coupled across them. The converter also includes two switching elements for switching current through the lamp during operation thereof at the high frequency. The switching elements are connected across the rectifying means. The rectifying means has a first junction point with a first capacitor connected thereto. A pair of capacitors with a second junction point therebetween is coupled across the rectifying means. A first inductor is coupled to the second junction point. The first capacitor and the first inductor are coupled to said AC input terminals.

In an alternate embodiment of the invention, the combination includes a fullwave bridge rectifying means which has a pair of diagonals. A first capacitor is connected to one of the pair of diagonals and a first inductor is connected to the other of the diagonals. The first capacitor and the first inductor in this alternate embodiment are also coupled to the AC input terminals.

BRIEF DESCRIPTION OF THE DRAWING

Other objects, features and advantages of the invention will become apparent from the following description and appended claims when considered in conjunction with the accompanying drawing, in which:

DESCRIPTION OF THE PREFERRED EMBODIMENT

Figures 1, 2:
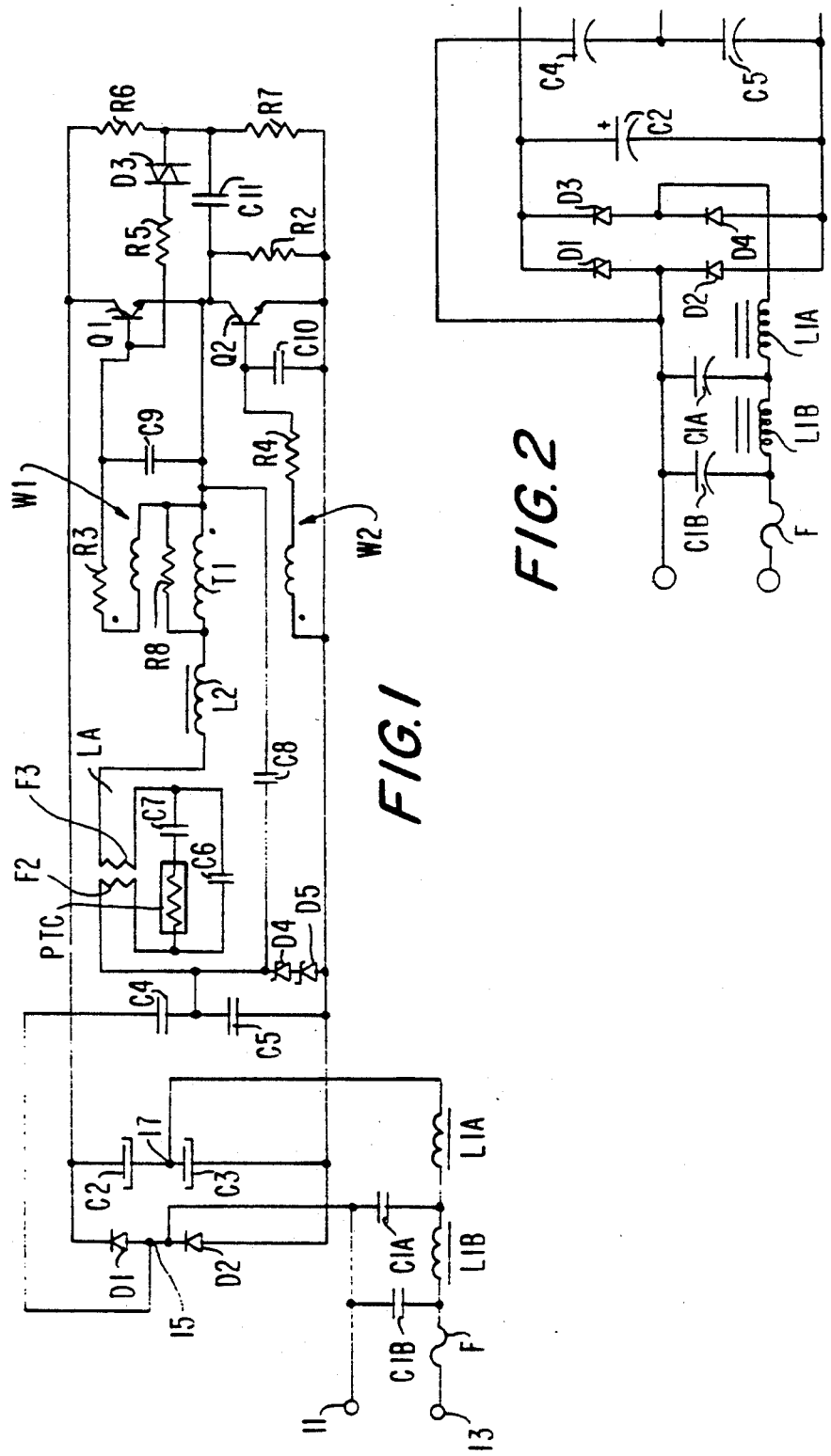
FIG. 1 shows a compact fluorescent lamp control circuit embodying the invention.
FIG. 2 shows an alternative embodiment of the input circuitry for the control circuit of FIG. 1.

Referring to FIG. 1, there is shown a compact fluorescent lamp LA coupled to an LC resonant circuit comprising inductor L2 and capacitor C6. Connected in parallel with lamp LA is a positive temperature coefficient resistor PTC which is in series circuit with a capacitor C7 which provides protection for resistor PTC. Resistor PTC enables the electrode windings of lamp LA to heat up before full voltage is applied thereto. Also, connected in parallel with the primary winding of transformer T1 is resistor R8. This resistor bypasses current around the primary which leads to a lower self-oscillation frequency for the circuit and results in higher current through inductor L2 and lamp LA.

Connected to the resonant circuit comprising inductor L2 and capacitor C6 is the primary of transformer T1. One secondary, W1, of transformer T1 is connected by way of resistor R3 to the base of transistor Q1. The other secondary, W2, of transformer T1 is connected through resistor R4 to the base of transistor Q2. Transistors Q1 and Q2 are part of a high frequency DC to AC converter for operating lamp LA. Capacitors C9 and C10 are connected between the base and emitter of transistors Q1 and Q2, respectively. The resistors R2, R5, R6, R7 and capacitor C11 and diac D3 form the starting circuits for pulsing transistors Q1 and Q2 into operation at the desired high frequency. Resistors R6 and R7 provide a voltage divider circuit which is unbalanced by capacitor C11 and resistor R2. When capacitor C11 charges sufficiently, diac D3 is caused to turn on which pulses transistor Q1 into operation.

With transistor Q1 conducting, the primary of transformer T1 in time will begin to operate in the associated non-linear region of its hysteresis curve. When it does, the circuitry becomes ready for conduction through the next half cycle of the high frequency voltage produced by the disclosed control circuit. With transistor Q1 conducting when the non-linear operation begins, conduction through secondary W1 to its base is cut off. As a result, the next half cycle of the high frequency voltage will produce conduction through the secondary, W2, of transformer T1. The secondary W2 is connected through resistor R4 to the base of transistor Q2 to turn it on during that half cycle.

Zener diodes D4 and D5 are connected in parallel with capacitor C5 to serve as a limit to the maximum voltage which can build up on electrolytic capacitors C2 and C3. These electrolytic capacitors are connected in parallel with the half bridge diodes D1 and D2. Capacitors C2 and C3 provide a so called "voltage doubling" operation for the circuit. Energy returning from the resonant circuit by way of capacitors C4 and C5 and diodes D1 and D2 is operative to develop a voltage across inductor L1A. This voltage is provided to electrolytic capacitors C2 and C3 and adds to the AC line voltage. By proper choice of capacitors C4 and C5 the half bridge inverter circuit will act like a high frequency boost converter to raise the voltage on each of the electrolytic buffer capacitors to a value above the peak line voltage. This improves the circuit power factor and reduces line current harmonics. The improved power factor means the circuit draws much lower input current. Capacitor C8 acts as a snubbing capacitance for shaping the high frequency AC pulse.

First capacitor C1A is coupled from the input terminals 11 and 13 to the junction 15 between diodes D1 and D2. First inductor L1A is coupled from input 13 to the junction 17 between electrolytic capacitors C2 and C3. In this way, first capacitor C1A and first inductor L1A provide current paths for the charging of electrolytic capacitors C2 and C3. In this way, the so-called "voltage doubling" effect is provided by capacitors C2 and C3 for proper operation of lamp LA. Capacitor C1B and inductor L1B provide an LC filter for keeping high frequency signals off the input lines to the ballast circuit. Capacitor C1B is coupled in parallel with capacitor C1A and inductor L1B is coupled in series with inductor L1A. Fuse F is connected to terminal 13 to provide protection against high current fault conditions.

In FIG. 2, the half bridge has been replaced by the full bridge D1-D4. Since this circuit was used with a lamp requiring less voltage than the lamp used with the circuit of FIG. 1, the voltage doubling effect was not required and capacitor C3 was eliminated. Capacitor C1A and inductor L1A were connected to the diagonals of the full bridge.

A description of the theory of operation of the circuit of FIG. 1 will be understood by those skilled in the art in view of the following discussion. For purposes of this explanation, it is assumed that a single pulse from diac D3 has turned transistor Q1 on. It is also assumed that a sufficient DC supply voltage has been developed across capacitors C2 and C3 to sustain self-oscillation. For purposes of this explanation, the line voltage across terminals 11 and 13 is assumed to be near the zero voltage crossing. With transistor Q1 conducting capacitor C2 acts as a voltage source which supplies current from the collector to the emitter of transistor Q1 through the primary of transformer T1, inductor L2 and the lamp load network consisting of capacitors C6, C7, lamp LA and resistor PTC. This current also flows through capacitor C4, junction 15, capacitor C1A and inductor L1A. Current through the primary of transformer T1, when transistor Q1 is conducting, causes current to flow through secondary winding W1 of transformer T1 to reinforce the base emitter current supply of transistor Q1, thus holding Q1 in its conductive state by positive feedback. As a result, current builds up through the aforementioned components. The rate of rise of this current is mainly controlled by the inductance of inductor L2. The current continues to rise until the hysteresis of the core of transformer T1 reaches a first non-linear region.

As the transformer action of transformer T1 becomes non-linear the base drive from secondary W1 drops off sharply, turning off transistor Q1 and current through the primary of transformer T1 ceases. When this occurs, linear transformer action returns to transformer T1 by the abrupt loss of its primary current. As a result, secondary winding W2 induces current into the base emitter junction of transistor Q2 thus turning that transistor on. With transistor Q2 conducting, capacitor C3 acts as a voltage source which supplies current through inductor L1A, capacitor C1A, junction 15, capacitor C4, the lamp load network (consisting of capacitors C6 and C7, lamp LA and resistor PTC,) inductor L2, the primary of transformer T1 and through the collector-emitter junctions of transistor Q2. This current through the primary of transistor T1 causes current to flow through the secondary winding W2 of transformer T1 to reinforce the base emitter current supply of transistor Q2 by positive feedback. As was the case when transistor Q1 was conducting, current builds up in the primary of transformer T1 until it begins to operate in the second non-linear region of its the hysteresis curve. When this occurs, the base drive for transistor Q2 drops off and the transistor becomes non-conducting. This action of transistor Q2 terminates the flow of current through the primary of transformer T1, which causes secondary winding W1 to again provide currents to the base of transistor Q1. This turns that transistor back to its conducting condition to self perpetuate the oscillation cycle. As a result, transistors Q1 and Q2 thus turn on and off alternately to produce alternating current through the lamp load network.

Having successfully started self oscillation in the circuit, the frequency of operation is determined by the non-linearity of the hysteresis curve of transformer T1 together with the shape and magnitude of the primary current of transformer T1 produced by the lamp load network and inductor L2, the base currents for transistors Q1 and Q2, the RC delay networks (R3, C9 and R4, C10) at the bases of transistors Q1 and Q2 and the switching times of transistors Q1 and Q2.

In the self oscillating state, a high frequency AC signal is fed back to capacitors C2 and C3 (FIG. 1) via the capacitor C4 and the rectifier circuit, D1 and D2. In the apparatus of FIG. 2, the high frequency AC feedback signal is supplied to capacitor C2 via capacitor C4 and the bridge rectifier D1-D4. Furthermore, alternating current flows from capacitors C2 and C3 as a result of the alternate on/off conditions of transistors Q1 and Q2. This alternating current flows through lamp filaments F1 and F2, capacitor C6, inductor L2 and the primary of transformer T1. Resistor PTC, which is in series with capacitor C7, provides extra resistive loading on the series resonant LC circuit consisting of inductor L2 and capacitor C6 which, as mentioned, allows for preheating of the lamp filaments. As resistor PTC heats up, its resistance increases. This causes the voltage to increase across capacitor C6 until lamp LA which is in parallel with capacitor C6 ignites. After lamp ignition, the lamp loads down the resonant LC circuit and current through the lamp is basically controlled by inductor L2, the lamp arc voltage, the input supply voltage on capacitors C2 and C3 and the self oscillation frequency of the circuit.

It should be apparent that various modifications of the above will be evident to those skilled in the art and that the arrangement described herein is for illustrative purposes and is not to be considered restrictive.

What is claimed is:

1. In combination, a compact fluorescent lamp with a high frequency DC-AC converter, said converter including a pair of AC input terminals for coupling to a low frequency mains source of AC voltage, said AC input terminals having rectifying means coupled across them, said converter including two switching elements for switching current through said lamp during operation thereof at said high frequency, said switching elements being connected across said rectifying means, said rectifying means having a first junction point, a first capacitor connected to said first junction point, a pair of capacitors with a second junction point therebetween, said pair of capacitors being coupled across said rectifying means, a first inductor connected to said second junction point, said first capacitor and said first inductor being coupled to said AC input terminals.

2. In combination, a compact fluorescent lamp with a high frequency DC-AC converter as claimed in claim 1 further comprising a second capacitor coupled in parallel with said first capacitor and a second inductor coupled in series with said first inductor.

3. In combination, a compact fluorescent lamp with a high frequency DC-AC converter in accordance with claim 2, wherein said rectifying means includes a bridge circuit and a voltage boosting means.

4. In combination, a compact fluorescent lamp with a high frequency DC-AC converter in accordance with claim 3, wherein said rectifying means is a half bridge rectifier.

5. In combination, a discharge lamp and a high frequency DC-AC converter, said converter including a pair of AC input terminals for coupling to a low frequency mains source of AC voltage, said AC input terminals having rectifying means coupled across them, said converter including two switching elements for switching current through said lamp during operation thereof at said high frequency, said switching elements being connected across said rectifying means, said rectifying means having a pair of diagonal terminals, a first capacitor connected to one terminal of said pair of diagonal terminals, a first inductor connected to the other terminal of said pair of diagonal terminals, means coupling said first capacitor and said first inductor to said AC input terminals, and a second capacitor coupling said discharge lamp to one of said diagonal terminals so that a high frequency current flows through the second capacitor to said one diagonal terminal.

6. In combination, a discharge lamp and a high frequency DC-AC converter a claimed in claim 5 including a capacitor coupled in parallel with said first capacitor and a second inductor coupled in series with said first inductor.

7. A high frequency converter for operating an electric discharge lamp comprising:
a pair of AC input terminals for connection to a low frequency source of AC supply voltage,
first and second DC supply voltage input terminals,
a rectifier circuit coupling said AC input terminals to said DC input terminals,
buffer capacitor means coupled to said DC input terminals,
a load circuit for connection to the discharge lamp,
first and second switching transistors coupled to said DC input lines and to said load circuit and controlled so as to alternately switch current through the lamp at a high frequency,
a first inductor coupled to one of said AC input terminals and to said buffer capacitor means, and
a first capacitor coupling said load circuit to said buffer capacitor means via said rectifier circuit so as to couple a high frequency current to said buffer capacitor means from said load circuit.

8. A high frequency converter as claimed in claim 7 further comprising, a second capacitor coupled to the other one of said AC input terminals and to an input terminal of the rectifier circuit.

9. A high frequency converter as claimed in claim 8 wherein said load circuit further comprises a resonant LC circuit coupled to said lamp and to a junction point between said first and second switching transistors.

10. A high frequency converter as claimed in claim 7 wherein said rectifier circuit comprises first and second diodes connected in series circuit to said DC input terminals and with a junction point between the diodes connected to said first capacitor, and wherein a voltage is developed across the first inductor so as to boost the voltage across the buffer capacitor means to a voltage level above the instantaneous level of an AC supply voltage at the AC input terminals.

11. A high frequency converter as claimed in claim 7 wherein the buffer capacitor means comprise second and third capacitors connected in a series circuit to the DC input terminals and the rectifier circuit comprises first and second diodes connected in a second series circuit to said DC input terminals, and wherein said first inductor is coupled between a junction point of the second and third capacitors and a junction point of the first and second diodes via a fourth capacitor.

12. A high frequency converter as claimed in claim 7 wherein said load circuit further comprises,
a transformer having a primary winding connected in series with the discharge lamp between said first capacitor and a junction point between the first and second switching transistors, said transformer having first and second secondary windings coupled to respective control electrodes of the first and second switching transistors to drive the switching transistors at said high frequency, and
a resistor connected in parallel with said transformer primary winding.

13. A high frequency converter as claimed in claim 7 wherein said rectifier circuit comprises first and second diodes connected in series circuit to said DC input terminals and with a junction point between the diodes connected to said first capacitor so that said load circuit is coupled to the buffer capacitor means via the first capacitor and at least one of said diodes.

14. A high frequency converter as claimed in claim 7 wherein said first capacitor and said first inductor supply charge currents to the buffer capacitor means such that a voltage is developed across the buffer capacitor means which is higher than the peak value of the AC supply voltage thereby reducing harmonic distortion on the AC supply voltage.

15. A high frequency converter as claimed in claim 8 wherein said rectifier circuit comprises first and second diodes connected in series circuit to said DC input terminals and with a junction point between the diodes connected to said first capacitor and to at least one AC input terminal, whereby the buffer capacitor means are continually charged via the diodes and the first capacitor.

16. A high frequency converter as claimed in claim 7 wherein said load circuit includes a resonant LC circuit coupled to said discharge lamp and via said first capacitor and said rectifier circuit supplies high frequency energy to the first inductor which is responsive thereto so as to boost the voltage developed across the buffer capacitor means to a level above the peak value of the AC supply voltage thereby to improve the converter power factor and to reduce harmonics on the AC supply voltage.

17. A high frequency converter as claimed in claim 12 wherein said transformer has a magnetic core which is periodically driven into a non-linear region of its hysteresis characteristic by a high frequency current flowing through the transformer primary winding.

18. A high frequency converter as claimed in claim 7 wherein said rectifier circuit comprises a diode bridge circuit having first and second diagonal input terminals and with the buffer capacitor means coupled across third and fourth diagonal output terminals of the diode bridge circuit and which comprise said first and second DC input terminals, respectively, and wherein said first inductor is connected in series circuit with a second capacitor between said first and second diagonal input terminals, and said first capacitor is connected to one of said diagonal input terminals.

19. A converter comprising:
input means for receiving an AC voltage,
inverter means for producing an output signal,
a rectifier circuit having an input coupled to said input means and an output coupled to said inverter means, and
feedback means for coupling a feedback signal indicative of said output signal to said input of the rectifier circuit.

20. A converter as claimed in claim 19 wherein said inverter means comprises:
a load circuit and switching means controlled so as to switch a current through the load circuit at a high frequency relative to said AC voltage, and
said feedback means comprises at least one impedance element coupled between the load circuit and the input of the rectifier circuit.

21. A converter as claimed in claim 20 wherein said converter further comprises buffer capacitor means coupled to the output of the rectifier circuit and to the inverter means, and wherein
said impedance element comprises a capacitor coupling a high frequency current from said load circuit to said buffer capacitor means via the rectifier circuit.

22. A converter as claimed in claim 20 wherein said converter further comprises buffer capacitor means coupled to the output of the rectifier circuit and to the inverter means, and
a filter circuit coupled to said input means and to said rectifier circuit so as to separate said high frequency current from said AC voltage.

23. A converter as claimed in claim 20 wherein said load circuit comprises a resonant LC circuit coupled to said switching means.

24. A converter as claimed in claim 19 wherein said inverter means comprises a load circuit for said output signal, said output signal being a high frequency AC signal, wherein
said converter further comprises buffer capacitor means coupled to the output of the rectifier circuit and to the inverter means, and
said feedback means comprises a capacitor coupled between the load circuit and the input of the rectifier circuit so that a high frequency AC feedback signal is coupled to said buffer capacitor means via said rectifier circuit.

25. A converter as claimed in claim 19 wherein the output of the rectifier circuit includes a buffer capacitor, the inverter means comprises switching means controlled so as to switch a current at a high frequency relative to said AC voltage, and said feedback means comprises a capacitor coupling the high frequency current to said buffer capacitor via the rectifier circuit.

* * * * *